(12) United States Patent
Di Cosmo et al.

(10) Patent No.: US 11,582,212 B2
(45) Date of Patent: Feb. 14, 2023

(54) TAMPER RESISTANT DEVICE FOR AN INTEGRATED CIRCUIT CARD

(71) Applicant: STMicroelectronics S.r.l., Agrate Brianza (IT)

(72) Inventors: Luca Di Cosmo, Naples (IT); Amedeo Veneroso, Caserta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 307 days.

(21) Appl. No.: 16/655,579

(22) Filed: Oct. 17, 2019

(65) Prior Publication Data

US 2020/0137034 A1 Apr. 30, 2020

(30) Foreign Application Priority Data

Oct. 30, 2018 (IT) .................. 102018000009917

(51) Int. Cl.
*H04L 9/40* (2022.01)
*G06K 7/10* (2006.01)
(Continued)

(52) U.S. Cl.
CPC ........ *H04L 63/062* (2013.01); *G06K 7/10247* (2013.01); *H04L 63/0823* (2013.01); *H04W 8/183* (2013.01); *H04W 12/069* (2021.01)

(58) Field of Classification Search
CPC combination set(s) only.
See application file for complete search history.

(56) References Cited

U.S. PATENT DOCUMENTS

| 2014/0036723 A1* | 2/2014 | Rizzo | H04B 5/0031 |
| | | | 370/254 |
| 2014/0258397 A1* | 9/2014 | Heerboth | H04L 41/08 |
| | | | 709/204 |

(Continued)

FOREIGN PATENT DOCUMENTS

WO WO-2017082966 A1 * 5/2017

OTHER PUBLICATIONS

GSM Association, Official Document 12FAST.15—"Remote Provisioning Architecture for Embedded UICC", Technical Specification, Version 1.0, Dec. 17, 2013, 294 pages.
(Continued)

*Primary Examiner* — Harris C Wang
(74) *Attorney, Agent, or Firm* — Slater Matsil, LLP

(57) ABSTRACT

A tamper resistant device can be used for an integrated circuit card. The device includes memory storing a first security domain that includes a telecommunication profile and a second security domain that includes an application profile. A first physical interface is configured to be coupled to a baseband processor configured to operate with a mobile telecommunications network. A second physical interface configured to be coupled to an application processor. The first physical interface configured to allow the baseband processor to access the telecommunication profile and the second physical interface is configured to allow the application processor to access the application profile. The tamper resistant device is configured to enable accessibility to the application profile if corresponding commands are received at the first interface and to enable accessibility to the telecommunication profile if corresponding commands are received at the second interface.

21 Claims, 4 Drawing Sheets

(51) Int. Cl.
    *H04W 8/18*           (2009.01)
    *H04W 12/069*       (2021.01)

(56) References Cited

U.S. PATENT DOCUMENTS

| | | | | |
|---|---|---|---|---|
| 2015/0349826 | A1* | 12/2015 | Li | H04W 8/183 |
| | | | | 455/558 |
| 2016/0088464 | A1* | 3/2016 | Hans | H04W 8/183 |
| | | | | 455/558 |
| 2016/0117683 | A1* | 4/2016 | Jung | G06Q 20/306 |
| | | | | 705/44 |
| 2016/0173156 | A1* | 6/2016 | Wane | G06F 21/64 |
| | | | | 455/558 |
| 2017/0222991 | A1* | 8/2017 | Yang | H04L 9/0825 |
| 2017/0295158 | A1* | 10/2017 | Chastain | H04W 4/50 |
| 2018/0288606 | A1* | 10/2018 | Gao | H04W 8/183 |
| 2019/0065749 | A1* | 2/2019 | Yang | G06F 21/572 |
| 2019/0364023 | A1* | 11/2019 | Marquardt | H04L 63/0428 |
| 2020/0137034 | A1* | 4/2020 | Di Cosmo | H04W 4/60 |
| 2020/0137555 | A1* | 4/2020 | Dos Santos | H04W 12/42 |
| 2020/0236533 | A1* | 7/2020 | Wane | H04W 12/04 |
| 2020/0351656 | A1* | 11/2020 | Johansson | H04W 12/40 |

OTHER PUBLICATIONS

Globalplatform, Card Specification, Version 2.2.1, Public Release, Jan. 2011, 562 pages.

* cited by examiner

TAMPER RESISTANT DEVICE FOR AN INTEGRATED CIRCUIT CARD

CROSS-REFERENCE TO RELATED APPLICATIONS

This Applications claims priority to Italian Patent Application No. 102018000009917, filed on Oct. 30, 2018, which application is hereby incorporated herein by reference.

TECHNICAL FIELD

Embodiments of the present disclosure relate a tamper resistant device for an integrated circuit card.

BACKGROUND

Due to new requirements of miniaturization and robustness, the industry has developed an evolution of the traditional SIM (Subscriber Identity Module) cards called "embedded UICC" (Universal Integrated Circuit Card). This evolution envisages that the SIM card is soldered (or in any case made hardly accessible) in the hosting device that can be a mobile phone, a modem, a board inserted in a device, etc.

Soldering presents distinct advantages such as the possibility of reducing the size of the SIM device and hence of the modem, the improvement of the robustness of the contacts (soldered contacts are typically more reliable than interfaces between replaceable components), the increased antitheft protection.

On the other hand, soldering a SIM (or making it hardly accessible) introduces new requirements and issues that need to be addressed. Because the SIM is not replaceable, means should be available to allow the operator change. Specific operations (such as device repairing), that today are typically performed after the SIM removal, require a way to disable the SIM card.

To address the above requirements, the industry has defined a new technological standard called "embedded UICC" or "Remote SIM provisioning."

The basic concepts of the new technological standard are the following:

one entity is defined to allow the download/enable/delete of profiles (for instance the Issuer Secure Domain Root ISD-R, see for instance "Remote Provisioning Architecture for Embedded UICC, Technical Specification, Version 1.0, 17 Dec. 2013"), the UICC may contain several mobile network operator subscriptions;

each operator subscription is represented by a "profile";

every profile may be seen as a container; the container is managed by a security domain (for instance the Issuer Secure Domain Profile ISD-P).

Thus the profile of a eUICC contains telecommunication credential issued by a certain Mobile Network Operator (MNO), fully representing such operator in containing all the information necessary to access the corresponding mobile network.

The eUICC is a tamper resistant device or platform (i.e., a device that cannot be fraudulently altered and that would be destroyed in case of unauthorized data accessed). For platform or computing platform is intended the environment in which piece of software are executed, which may include for instance the hardware alone or also the operating system or other elements such as the API, e.g., the components with which the code of the software is executed.

Another tamper resistant device, more specifically a tamper resistant hardware platform, typically present in a high end mobile phone is the so-called Secure element. The Secure element is a different device with respect to the eUICC in that it is managed directly by the OEM (Original Equipment Manufacturer). The Secure Element contains payment applications and credentials to allow payments over the NFC (Near Field Communication) link of an electronic device containing such NFC link, e.g., a NFC transceiver.

The Secure Element may contain user information managed by the OEM (like the user fingerprint or the user PIN, etc.).

The Secure Element is therefore similar to a eUICC, being a tamper resistant device which is used in an electronic device, e.g. a mobile terminal, to store sensitive data to access services, e.g. payment services or telecommunication services, but it does not provide the telecommunication services, i.e. does not contain a telecommunication file system or applications) and it is not managed by the MNO environment, it is managed by the OEM directly instead.

As mentioned, the embedded Secure Element and the eUICC can be both present in an electronic device.

In this context, FIG. 1 shows a possible architecture of an electronic device 10, such as a mobile device, e.g. a smartphone or a tablet.

Generally, the electronic device 11 such a mobile phone comprises an application processor 12 and a baseband processor 13. A SPI (Serial Parallel Interface) interface 17 is provided configured to exchange signals between the application processor 12 and an embedded Secure Element (eSE) device. In this case the electronic device 10 includes an embedded Secure Element 14 comprising at least an application profile, specifically a secure element profile, which is implemented by a hardware tamper resistant platform, e.g. a secure microcontroller, 11. The embedded Secure Element 14 is coupled then to a NFC controller 16 by a SWP (Single Wire Protocol) connection 19a.

Also a baseband processor 13 which may operate under the control of the application processor 12 is provided. A ISO (International Standards Organization) interface 18 is provided configured to exchange signals between the baseband processor 13 and an embedded UICC, or eUICC. In this case the device 10 includes an eUICC 15 comprising at least a telecommunication profile Pj, e.g. a profile according to the Profile Package standard with credentials to access a mobile communications network. The profile may include authentication credentials, an applet with a respective Toolkit Application Reference and OTA (Over The Air) module. The eUICC 15 is implemented in a further hardware tamper resistant platform, i.e. a hardware device 11. The eUICC 15 may be coupled then to the NFC controller 16 through a SWP (Single Wire Protocol) connection 19b.

The application processor 12 as mentioned interacts directly with the embedded Secure Element 14, but may interact indirectly, through the baseband processor 13, with the eUICC 15. If an embedded Secure Element 14 is present, typically the eUICC SWP 19b is disabled.

The embedded Secure Element and the eUICC presents many common aspects. With reference to the layer diagram of FIG. 2 showing ISO layers for both the embedded Secure Element 14 and the eUICC 15, at the hardware layer HL is implemented usually through the same hardware device 11 or similar hardware devices, for instance the ST33G1M2 secure microcontroller. In variant embodiments for the embedded Secure Element 14 the hardware protocol used may be I2C or SPI and ISO T=0 or ISO T=1 are simulated over I2C/SPI. A same level of security is provided within such hardware context. Then at the operating system level, OL, a Java Card System platform JCS is usually used in both devices 14, 15, as well as the Global Platform at a API level APL.

More in detail, e.g. a Java Card System JCS is executed by the operating system, which manages and runs applets, i.e. applications using the APIs (Application Programming Interface) provided by the Java Card System JCS.

For example, the Java Card System JCS for the eUICC comprises usually a SIM and/or USIM API which manages the basic Subscriber Identity Module commands and provides functions to higher level SIM or USIM applets. This technology is well known to those skilled in the art, rendering a more detailed description herein superfluous.

Often the Java Card System JCS comprises the GlobalPlatform module GP according to the "GlobalPlatform Card specification", e.g. version 2.2.1. Also this standard is well known to those skilled in the art, rendering a more detailed description herein superfluous. Basically, the GP module provides features such as user authentication through secure channels, or the installation and remote management of the applets. The above mentioned API functions may then be used by applets, such as the SIM or USIM applet, a basic applet B_APP and/or a secure applet S_APP. In particular in the eUICC a profile manager is preferably provided in the API layer.

Then for the Secure Element 14 payment applications in corresponding application profiles S1, S2 (the generic application being indicated with S1) are provided at the application level AL, while for the eUICC 15 a telecommunication operating system TO in an OAL layer is provided over the API layer APL, e.g. GlobalPlatform, including telecommunication SIM or USIM mechanisms, and above, at application level AL, telecommunication profiles P1, P2 (the generic profile being indicated with Pj) supplied by the MNO with the so called Remote Provisioning are provided.

Thus electronic mobile devices such as a smartphone or a tablet may contain in addition to the eUICC, other platforms for other services, with an increase of the hardware in the mobile devices and of the related costs.

SUMMARY

Embodiments of the present disclosure relate to solutions regarding a tamper resistant device implementing an embedded Universal Integrated Circuit Card comprising at least a security domain in which at least a telecommunication profile is stored. The device comprises a physical interface configured to allow access from a processor configured to operate with at least a mobile telecommunications network to the at least a telecommunication profile. The tamper resistant device comprises a further security domain storing at least an application profile.

Particular embodiments of the present disclosure relate to the technical context of Remote SIM Provisioning technology, also known as the Embedded UICC (Universal Integrated Circuit Card) and of embedded Secure Elements for payment applications.

Embodiments can provide solutions which overcome one or more of the previously outlined drawbacks.

Embodiments moreover concern a related method as well as a corresponding related computer program product, loadable in the memory of at least one computer and including software code portions for performing the steps of the method when the product is run on a computer. As used herein, reference to such a computer program product is intended to be equivalent to reference to a computer-readable medium containing instructions for controlling a computer system to coordinate the performance of the method. Reference to "at least one computer" is evidently intended to highlight the possibility for the present disclosure to be implemented in a distributed/modular fashion.

As mentioned in the foregoing, the present disclosure provides solutions regarding a tamper resistant device implementing an embedded Universal Integrated Circuit Card comprising at least a security domain in which at least a telecommunication profile is stored. The device comprises a physical interface configured to allow access from a processor configured to operate with at least a mobile telecommunications network to the at least a telecommunication profile. The tamper resistant device comprises a further security domain storing at least an application profile. The tamper resistant device comprises a further physical interface configured to allow access from an application processor to the at least an application profile stored in the further security domain. The single tamper resistant device is configured to enable accessibility to the at least an application profile if corresponding commands are received in signals exchanged on the first interface and to enable accessibility to the telecommunication profile if corresponding commands are received in signals exchanged on the second interface.

In variant embodiments, the solution here described provides that the further application profile corresponds to an application profile of an embedded Secure Element.

In variant embodiments, the solution here described provides that the further application profile corresponds to an application profile of a Trusted platform module.

In variant embodiments, the solution here described provides that the first interface is a SPI interface and the second interface is an ISO interface.

In variant embodiments, the solution here described provides that the application profile in a further security domain is coupled for communication with a NFC module.

In variant embodiments, the solution here described provides that the device is configured to perform a routing operation by selecting, on the basis of which physical interface APDU commands are received, the security domain to which accessibility is enabled.

In variant embodiments, the solution here described includes, for the application profiles and the telecommunication profiles, respective instances of an application registry, a of an issuer security domain root (ISD-R) and of an eUICC Controlling Authority Security Domain (eCASD).

In variant embodiments, the solution here described includes a memory with hardware separated areas for storing the security domains and respectively associated application profiles and telecommunication profiles and the routing operation includes selecting, on the basis of which physical interface APDU commands are received the security domain to which accessibility is enabled by enabling access to the corresponding memory area.

In variant embodiments, the solution here described includes a SWP (Single Wire Protocol) interface configured to interface to the NFC controller either the application profile or the telecommunication profile depending on which physical interface receives the commands.

The present disclosure provides also solutions regarding an electronic device comprising an application processor and a baseband processor configured to operate with at least a mobile telecommunications network, the device comprising a tamper resistant device according to any of the previous embodiments.

The present disclosure provides also solutions regarding a method to access profiles in a tamper resistant device implementing an embedded Universal Integrated Circuit Card according to any of the previous embodiments. The method comprises providing a physical interface configured to allow access from a processor configured to operate with at least a mobile telecommunications network for at least a telecommunication profile, providing a further physical interface configured to allow access from an application processor to at least an application profile stored in a further security domain in the tamper resistant device, and enabling accessibility to the at least an application profile if corresponding commands are received in signals exchanged on the first interface and enabling accessibility to the telecommunication profile if corresponding commands are received in signals exchanged on the second interface.

The present disclosure provides also solutions regarding a computer-program product that can be loaded into the memory of at least one processor and comprises portions of software code for implementing the previous method.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
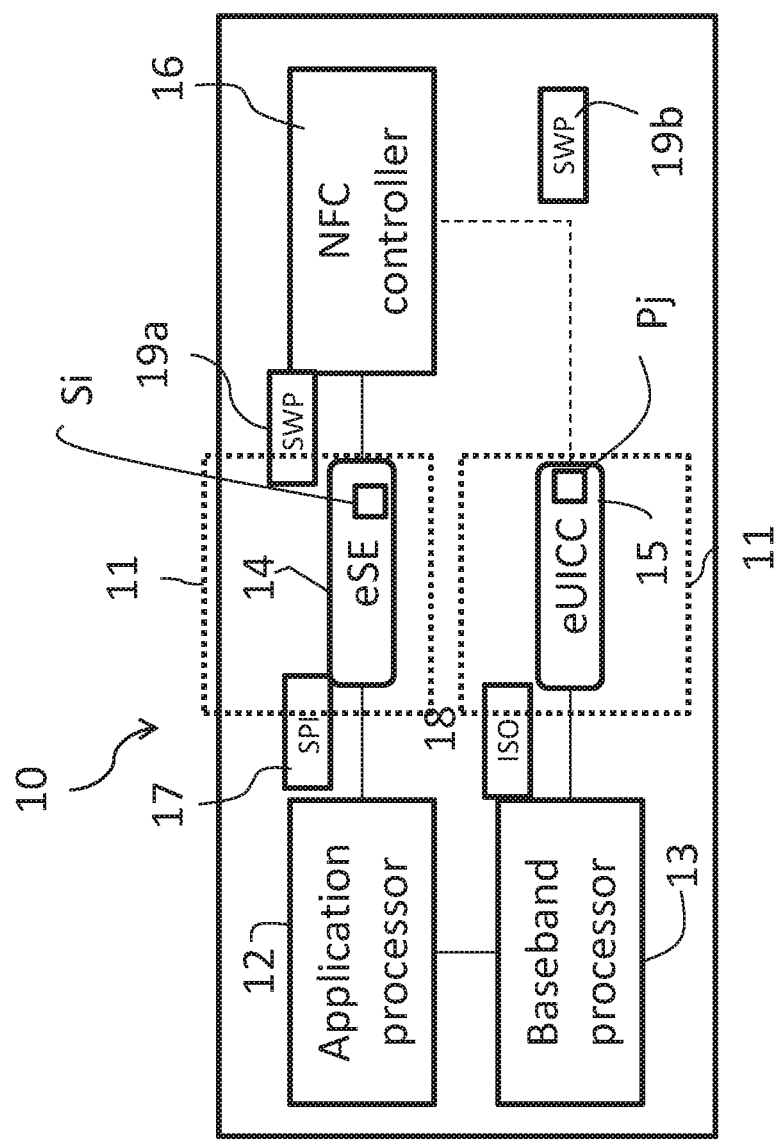
FIGS. 1 and 2 have already been described in the foregoing.
Figure 2:
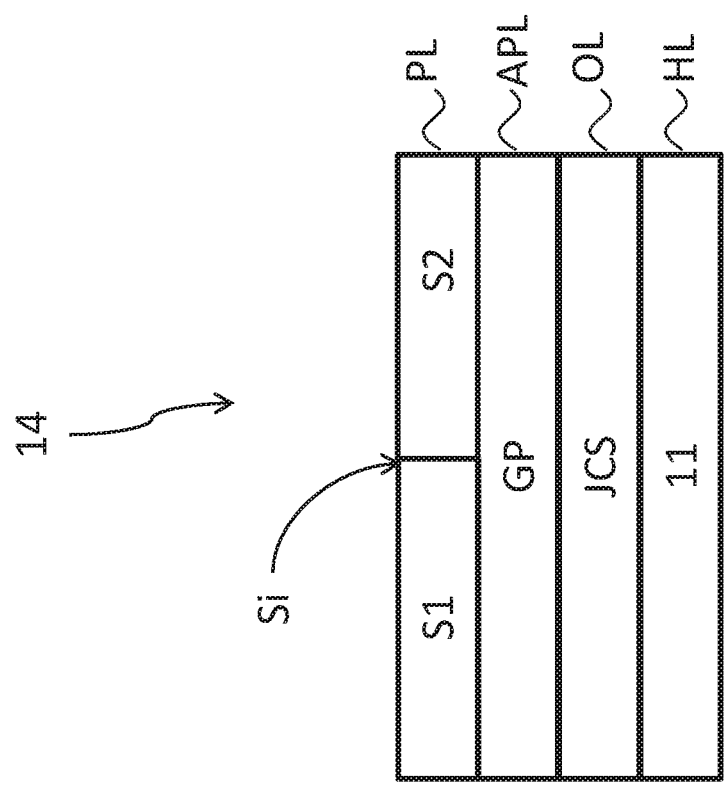
Figure 2:
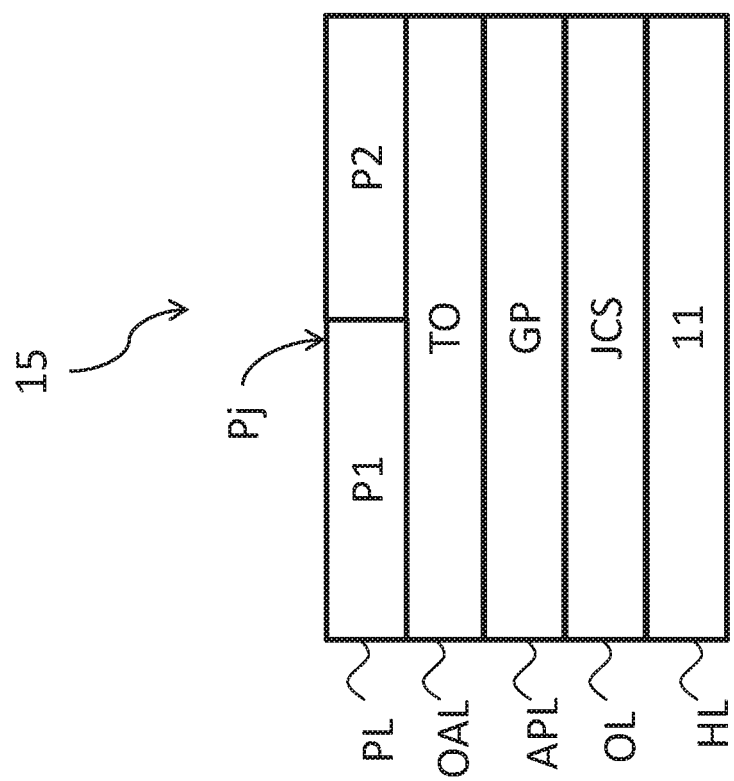

Figures parts, elements or components which have already been described with reference to FIGS. 1 and 2 are denoted by the same references previously used in such Figures; the description of such previously described elements will not be repeated in the following in order not to overburden the present detailed description.

From FIG. 1 it turns out that there are several common points in term of hardware, operative system and API at least, between the two tamper resisting devices, thus it can be considered to merge such two devices, in a single device that provides both functionalities, e.g. payment applications and telecommunication services.

Solutions which allow a single view of profiles and separated security domains, i.e. one security domain for the telecom part and one for the eSE part, would not allow having the same application in two profiles. Also there are problems in terms of managements as the eUICC manager role (MNO) is different from eSE Manager (OEM).

Furthermore mobile telecommunication profiles may offer services that determine a conflict with the embedded Secure Element 14, e.g. an application that decides which Android apps can access the device (for instance the known ARA-M application) would need different configurations imposed by the profile manager of the eUICC and by the embedded Secure Element manager.

In addition, it should be guaranteed that embedded Secure Element services do not interfere with the eUICC services and vice versa, also to maintain validity of certified configuration and profile owner (or embedded Secure Element owner) testing.

Figure 3:
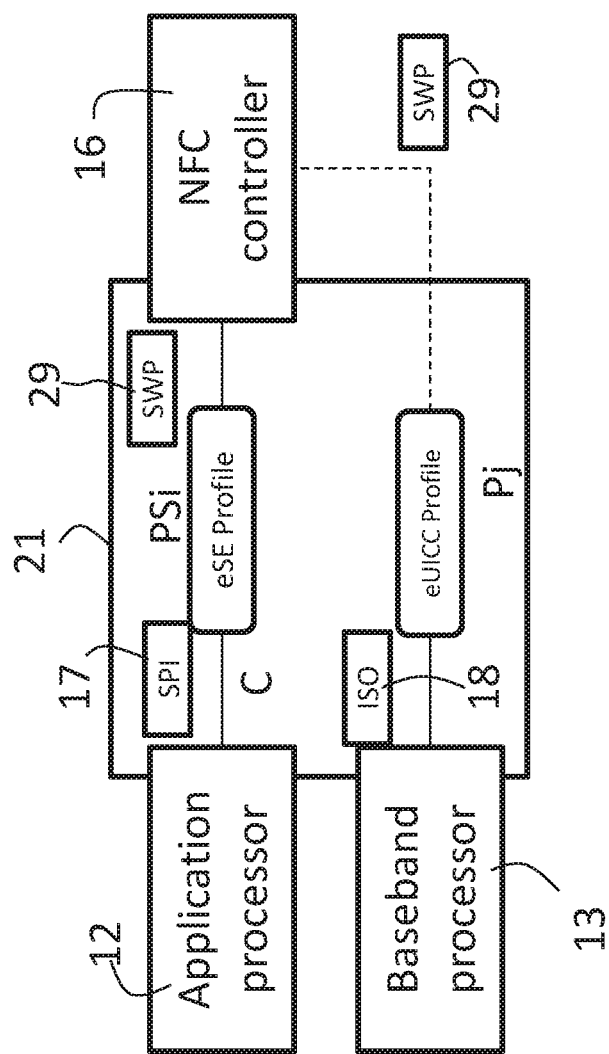
FIG. 3 shows an embodiment of an electronic device according to the solution here described.

Now, with reference to FIG. 3 it is illustrated a block schematics of an electronic device 20 which includes a single tamper resistant device 21, implemented by way of a secure controller, in the embodiment a ST33G1M2 controller, although for instance other controller of the ST33G may be used, which stores both a mobile telecommunication profile Pj enabled to provide telecommunication services authentication and credential to manage such authentication and an application profile PSi that contains embedded Secure element payments applications (e.g. Visa, Master-Card payment applets) and credentials to manage the payment applications.

The mobile telecommunication profile Pj and application profile PSi are stored isolated one with respect to the other in the single tamper resistant device 21 and a same application may be present in both profiles, like the ARA-M application mentioned previously.

The application and baseband processor 12, 13 of the device 20 are interfaced through respective SPI and ISO interfaces 17, 18 in the same way described with reference to FIG. 1.

The visibility of the profile Pj or PSi by the electronic device 10, e.g., to which profile and related applets is enabled the access from the electronic device, specifically by its processors 12, 13. In the solution here described is based on which physical interface is used by such device 10 or processors 12, 13. More specifically, then the single tamper resistant device 21 receives commands over the SPI interface 17, the Secure element profile PSi is made accessible. When such commands are received over the ISO interface 18, the eUICC profile Pj is made accessible.

The single tamper resistant device 21 is configured to have two different instances of the relevant components, such as applications and credentials to perform profile management, known in the telecom profile management as ISD-R and eCASD, and registries depending on the hardware interface 17 or 18 used by the current command.

The SWP interface 29 to the NFC controller 16 can be assigned to either the Secure element profile PSi or the eUICC profile Pj depending on the device configuration, e.g. which physical interface is accessed. In variant embodiments of the device 21 other architectures may be used. In preferred embodiment the SWP interface may be coupled to the profile in the eSE element. In variant embodiments, the SWP interface may not be present. In further variant embodiments the SWP interface may be coupled to the eUICC profile. In further variant embodiments two SWP pins may be provided one coupled to the eSe and the other to the eUICC. In further variant embodiments, one SWP to both the eSe and eUICC elements may be provided, using a higher level protocol (HCI) to distinguish between one and the other (HCI has a "Host" indication so in this architecture two hosts would be present)

More in particular, the availability of applications in profiles Pj or SPi depends on physical interface 17 or 18 being used and on the currently active profile in either the secure element or the eUICC.

An application registry is provided in the single tamper resistant device 21 configured to store information about the profile to which the application invoked by the commands transmitted on one of the interfaces 17, 18 belongs.

Each application may be visible on distinct profiles Pi, SPj with the same AID (Application Identifier), but each profile owns a different instance of the application (thus guaranteeing data separation).

A profile registry is maintained in the device 21. In order to allow profile management on the eUICC 15 and embedded Secure Element 14, two distinct and respective ISD-R, so called "Profile o", are handled. In the profile registry is stored an available profiles list which includes an active telecommunication profile Pj, an active eSE profile PSi and several deactivated profiles, either eUICC or eSE profiles.

As mentioned the profile which is visible, i.e. made accessible, to the electronic device 10 depends on the physical interface which is accessed by such device 10. In particular when an APDU (Application Program Data Unit) command C is received on the ISO 7816 interface 18, a telecommunication ISD-R, or telecommunication "Profile o" Po plus the active profile Pj becomes visible.

When an APDU command C is received on SPI interface (eSE), an eSE ISD-R "Profile o" PSo plus the active profile Sj become visible.

As a same application, such as ARA-M, can be present in both profiles, the platform 21 is configured to perform concurrent execution of an application running in two Profiles. Such concurrent execution is based on a cooperative multi-tasking performed according to well-known specifications (Java Card Runtime Environment).

APDU commands C can be thus received concurrently over the available physical interfaces. The device 21 is configured to include a single runtime module that processes APDUs sequentially. A Profile Router PR is provided that implements the arbitration required to make concurrently received APDUs sequential and instructs the Runtime module to process them according to such cooperative multi-tasking procedure.

Figure 4:
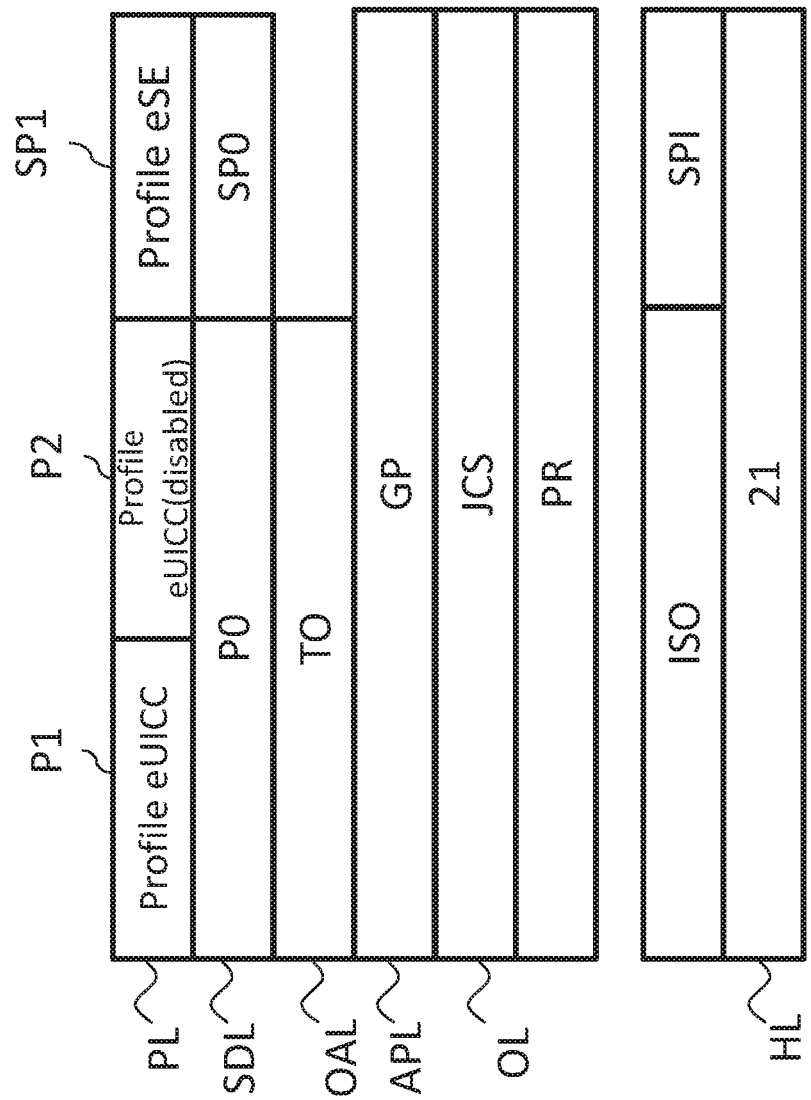
FIG. 4 shows a layer diagram representing the layer architecture of an anti tamper device used in the electronic device of FIG. 3.

In FIG. 4 it is shown a layer diagram which represents the configuration of the platform 21.

At hardware level HL therefore is provided in the electronic device 10 the tamper resistant device 21, in the example a ST33G1M2 secure microcontroller.

The logic layer structure is substantially the same of a eUICC, e.g. an operating system level, OL, is provided above the hardware layer HL, the Java Card System platform JCS, and the API level APL, in particular the Global Platform GP. The telecommunication operating system TO in an OAL layer is provided over the API layer APL. Above that that the profile layer PL.

The difference is that first an interface logic layer IL corresponding to that of SPI interface 14 and ISO interface 15 is provided between the hardware layer HL and the operating system layer OL, on top of such interface logic layer IL a logic routing layer RL being also provided which is embodied by a profile router PR, i.e. the platform 21 is configured to implement, preferably via software, a routing function which, on the basis of which interface 17, 18 the APDU commands are sent interacts with a secure domain level SDL, e.g., the level of the ISD-R for the security domains of the eUICC and eSE, selects the UICC ISD-R Po or the eSE ISD-R PSo, e.g., the application profile in the eUICC secure domain or the application profile in the eSe secure domain.

In this way is implemented visibility of either the active telecommunication profile Pj or of the active application profile PSi.

As it can be derived from FIG. 4 the layers can be considered as corresponding to the layer structure of the eUICC 15 with the addition of application profiles PSi and a selection mechanism embodied by the profile router PR operating on the ISD-R, one of which is already present and the other added for the eSe profiles.

The selection mechanism of the profile router PR exploits the fact that the platform 21 is configured with separated memory at hardware level to avoid the possibility of accessing memory from one profile to another.

The device 21 includes memory areas that can be split, in a manner per se known to the person skilled in the art in a plurality of memory portions assigned to the application profiles PSi and telecommunication profiles SPj, such memory being enabled under the control of the profile router PR, which is configured to enabled each area APDU command by APDU command. For instance when an APDU command C is received on the SPI interface 17, the memory areas corresponding to the application profile PSi and of the application ISD-R PSo are enabled, while the memory areas of the telecommunication profiles Pj and of the telecommunication ISD_R Po are disabled.

Such step of selecting, on the basis of which physical interface 17, 18 APDU commands C are received, the security domain Po, PSo to which accessibility is enabled by enabling access to the corresponding memory area can be performed by different procedure or mechanisms operating on the memory addresses.

By way of example, a first procedure to implement such step of selecting the security domain Po, PSo to which accessibility is enabled, accessing separate or split memory area can exploit a MMU (Memory Management Unit). The MMU operates as follows: the operating system operates in two states, a user mode and a superuser mode. In user mode, physical addresses are not usable but every access is performed by means of "virtual addresses". A look up table is filled in superuser mode at the beginning with mapping indications, mapping virtual addresses to physical addresses e.g. "virtual address segment 1—e.g. the data of the USIM application)—is mapped to physical address 0x20003000". Therefore by way of such look-up table different mappings of them memory can be performed.

Thus, on the basis of the interface on which a command is sent, the MMU can select a first mapping, e.g., corresponding to SPI interface, with addresses in a given memory area, the area with the ISD-R SPo and application profiles PSi, or a second mapping, e.g. corresponding to the ISO interface, with addresses in a further given memory area, the area with the ISD-R Po and the telecommunication profiles Pj. These two mappings are such that the two memory areas are separated one with respect to the other. In further embodiments the MPU (Memory Protection Unit) may be exploited in a similar way. With this approach there are always two states (super-user and user), the super-user states configures the MPU indicating "access allowed from address 0x20003000 to address 0x20004000000" before switching to "user."

Then the telecommunication operative system in user mode accesses directly the memory but if it tries to access outside the allowed areas an exception is thrown. The main difference between the MPU procedure and MMU procedure is that with the MPU the operative system operates with physical addresses while with the MMU it operates with virtual addresses. Both the procedures however on the basis of the interface which is accessed, select a different memory mapping.

Such hardware enabling/disabling eases the assessment of the separation and any potential certification.

A further aspect of the electronic device with a single tamper resistant device here described regards the possibility of adding to the Java Card applications also native extensions that only apply to a specific profile.

The single tamper resistant device 21 is configure to comprise a distinct list of operative system entry points for well-known native functionalities (e.g. crypto algorithms) which is handled per profile.

A same operative system native function may have distinct implementations on a profile basis.

Native extensions can be activated/deactivated the same as patches of the operative system.

Since the domain of the embedded Secure element is managed differently with respect to the eUICC the two ISD-R Po, PSo, have different credentials, one related for instance to the GSMA, in order to operate with the MNO, and one related to the OEM. Therefore, separated ISD-R and separate eCASD (eUICC Certificate Authority Security Domain) are provided at the ISD-R level.

Having provided separated ISD-R and separate eCASD it is possible to perform profile management also for the application profiles SPj. This is not usually required for embedded Secure elements, however the dual ISD-R structure allows the addition of such functionality to the embedded Secure element, e.g. in variant embodiments the single tamper resistant device 21 is configured also to download/upgrade the application (eSE) profile PSi.

Therefore the described solution provides an electronic device including a single controller with eSE/eUICC integration, where the respective domains are strongly separated, but with strong separation among the two domains. The full memory/registry separation impeding the possibility of having the same application in two profiles.

Thus summing up, substantially is described a tamper resistant device 21 implementing an embedded Universal Integrated Circuit Card 15 comprising at least a security domain, which correspond to the domain marked by the ISD-R Po, in which at least a telecommunication profile Pj is stored, although in general a plurality of telecommunication profiles is store. The device 21 comprises a ISO physical interface 18 configured to allow access from the application processor 13 configured to operate with at least a mobile telecommunications network to the at least a telecommunication profile Pj, the tamper resistant device 21 comprising also further security domain PSo storing at least an application profile PSi.

However, instead of accessing such application profile PSi through the same interface, the tamper resistant device 21 comprises a further physical interface 17 configured to allow access from the application processor 12 to such application profile PSi) stored in the further security domain PSo. The tamper resistant device 21 is configured to enable accessibility to the at least an application profile PSi if corresponding commands C, e.g. the APDUs, are received in signals exchanged on the first interface 17, in particular SPI, and to enable accessibility to the telecommunication profile Pj if corresponding commands C are received in signals exchanged on the second interface 18, in particular ISO.

The profile routing, e.g., making accessible a security domain corresponding to a certain ISD-R or the other given the physical interface accessed is obtained by a configuration, i.e. dedicated programming, of the operating system, e.g. the Java Card System. More in particular the device 21 starts with two ISD-R, Po, SPo, and "zero" profiles; then, every profile loaded by the telecommunication ISD-R will be considered telecom profile Pj, and the same is done for profiles loaded by the eSE ISD-R which are considered application profiles PSi. The profile routing makes accessible a security domain corresponding to a certain ISD-R or the other given the physical interface accessed by enabling access to the isolated area of the memory of the platform 21 where the relevant security domain is stored, while the other memory area access is disabled.

The solution thus is directed also to a method to access profiles in a tamper resistant device 21 implementing an embedded Universal Integrated Circuit Card 15 according to one of the embodiments discloses, which includes the operations of: providing a physical interface 18 configured to allow access from a processor 13 configured to operate with at least a mobile telecommunications network to the at least a telecommunication profile Pj, providing a further physical interface 17 configured to allow access from an application processor 12 to at least an application profile PSi stored in a further security domain PSo in the tamper resistant device 21, and enabling accessibility to the at least an application profile PSi if corresponding commands C are received in signals exchanged on the first interface 17 and enabling accessibility to the telecommunication profile Pj if corresponding commands C are received in signals exchanged on the second interface 18.

The operations of the method may include defining a routing function in the operative system, in particular in the Java Card System, to perform the operation of enabling accessibility to the at least an application profile PSi if corresponding commands C are received in signals exchanged on the first interface 17 and enabling accessibility to the telecommunication profile Pj if corresponding commands C re received in signals exchanged on the second interface 18.

The operations of the method may include also providing separate ISD-R and eCASD for each of the security domain.

Of course, without prejudice to the principle of the invention, the details of construction and the embodiments may vary widely with respect to what has been described and illustrated herein purely by way of example, without thereby departing from the scope of the present invention, as defined by the ensuing claims.

Other kind of secure device might be integrated instead of the eSE and the eUICC, for instance the device described can use a Trusted Platform module (TPM) as defined by TCG (Trusted Computing Group) in place of the embedded Secure Element.

The solution here described is directed in general to an electronic device, such as a smartphone or a tablet, comprising an application processor and a based band processor. As indicated a first interface configured to exchange signals between such application processor and a tamper resistant device, e.g. an eSE or TPM, comprising at least an application profile, may be embodied by a SPI interface, but other interfaces may be possibly employed to access the platform, e.g., I²C.

What is claimed is:

1. A tamper resistant device for an embedded Universal Integrated Circuit Card, the device comprising:
   memory storing a first security domain that includes a telecommunication profile and a second security domain that includes an application profile;
   a first physical interface configured to be coupled to a baseband processor that is configured to operate with a mobile telecommunications network, the first physical interface configured to allow the baseband processor to access the telecommunication profile; and
   a second physical interface configured to be coupled to an application processor, the second physical interface configured to allow the application processor to access the application profile, wherein the tamper resistant device is configured to enable accessibility to the application profile when corresponding commands are received in signals exchanged at the first interface and to enable accessibility to the telecommunication profile if corresponding commands are received in signals exchanged at the second interface, and wherein the device is configured to perform a routing operation to select whether accessibility to the first security domain or the second security domain is enabled based on which physical interface the commands are received.

2. The device according to claim 1, wherein the application profile corresponds to an application profile of an embedded secure element.

3. The device according to claim 1, wherein the application profile corresponds to an application profile of a Trusted platform module.

4. The device according to claim 1, wherein the first interface is a serial peripheral interface (SPI) and the second interface is an International Standards Organization (ISO) interface.

5. The device according to claim 1, further comprising a SWP (Single Wire Protocol) interface configured to interface a near field communication (NFC) controller with either the application profile or the telecommunication profile.

6. The device according to claim 1, further comprising an application registry configured to store information indicating the application profile to which an application belongs.

7. An electronic device comprising:
   a tamper resistant device implementing an integrated circuit card, the tamper resistant device storing a first security domain that includes a telecommunication profile and a second security domain that includes an application profile;
   a baseband processor configured to operate with a mobile telecommunications network;
   an application processor;
   a first physical interface configured to allow access from the baseband processor to the telecommunication profile, the first physical interface being a serial peripheral interface (SPI); and
   a second physical interface configured to allow access from the application processor to the application profile, the second physical interface being an International Standards Organization (ISO) interface, wherein the tamper resistant device is configured to enable accessibility to the application profile if corresponding commands are received in signals exchanged on the first interface and to enable accessibility to the telecommunication profile if corresponding commands are received in signals exchanged on the second interface.

8. The device according to claim 7, wherein the integrated circuit card is an embedded Universal Integrated Circuit Card.

9. The device according to claim 8, wherein the application profile corresponds to an application profile of an embedded secure element.

10. The device according to claim 7, wherein the application profile corresponds to an application profile of a Trusted platform module.

11. The device according to claim 7, further comprising a near field communication circuit, wherein the application profile is provided for communication with the near field communication circuit.

12. The device according to claim 11, further comprising a SWP (Single Wire Protocol) interface configured to interface an NFC controller with either the application profile or the telecommunication profile depending on which physical interface receives the commands.

13. The device according to claim 7, wherein the device is configured to perform a routing operation to select whether accessibility to the first security domain or the second security domain is enabled based on which physical interface the commands are received.

14. The device according to claim 13, further comprising a memory with hardware separated areas for storing the first and second security domains, wherein accessibility is enabled by enabling access to the corresponding memory area.

15. The device according to claim 13, wherein the routing operation includes also performing an arbitration required to make concurrently received commands sequential.

16. The device according to claim 7, further comprising an application registry configured to store information indicating the application profile to which an application belongs.

17. The device according to claim 7, wherein respective instances of an issuer security domain root and of an eUICC Controlling Authority Security Domain (eCASD) are included for the application profile and the telecommunication profile.

18. A method of accessing profiles in a tamper resistant device implementing an embedded Universal Integrated Circuit Card, the device comprising a serial peripheral interface (SPI) configured to allow a baseband processor access to a telecommunications profile stored in a first security domain and an International Standards Organization (ISO) interface distinct from the serial peripheral interface, the ISO interface configured to allow an application processor access to an application profile stored in a second security domain, the method comprising:
   receiving commands at the serial peripheral interface or the ISO interface;
   enabling accessibility to the application profile when the commands are received at the serial peripheral interface; and
   enabling accessibility to the telecommunication profile when the commands are received at the ISO interface.

19. The method of claim 18, further comprising:
   defining a routing function in an operative system to perform enabling accessibility to the application profile when the commands are received at the serial peripheral interface and enabling accessibility to the telecommunication profile when the commands are received at the ISO interface; and providing separate ISD-R and eCASD for each of the security domain.

20. A non-transitory memory storing software code that, when executed by at least one processor, causes the at least one processor to implement the method according to claim 18.

21. The method of claim 18, wherein the application profile corresponds to an application profile of an embedded secure element or Trusted platform module.

* * * * *